(12) United States Patent
Maiya Belur et al.

(10) Patent No.: US 10,447,536 B2
(45) Date of Patent: Oct. 15, 2019

(54) MANAGING CROSS-CLOUD DISTRIBUTED APPLICATION

(71) Applicant: VMWARE, INC, Palo Alto, CA (US)

(72) Inventors: Gurudutt Maiya Belur, San Carlos, CA (US); Ankur Soni, San Jose, CA (US); Prashant Basavaraj Gadagi, San Jose, CA (US); Lakshmikumar Madhavan, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 172 days.

(21) Appl. No.: 15/789,211

(22) Filed: Oct. 20, 2017

(65) Prior Publication Data

US 2019/0123960 A1    Apr. 25, 2019

(51) Int. Cl.
| | |
|---|---|
| *G06F 15/173* | (2006.01) |
| *H04L 12/24* | (2006.01) |
| *G06F 9/50* | (2006.01) |
| *H04L 29/08* | (2006.01) |
| *H04L 12/911* | (2013.01) |

(52) U.S. Cl.
CPC ........ *H04L 41/0826* (2013.01); *G06F 9/5077* (2013.01); *H04L 41/145* (2013.01); *H04L 47/70* (2013.01); *H04L 67/10* (2013.01); *H04L 41/12* (2013.01); *H04L 41/142* (2013.01); *H04L 41/5096* (2013.01)

(58) Field of Classification Search
CPC ..... H04L 41/0826; H04L 47/70; H04L 67/10; G06F 9/5077
USPC ........................................................ 709/226
See application file for complete search history.

(56) References Cited

U.S. PATENT DOCUMENTS

| | | | |
|---|---|---|---|
| 8,954,564 B2 | 2/2015 | Ferris et al. | |
| 9,223,632 B2 | 12/2015 | Iyer et al. | |
| 9,306,868 B2 | 4/2016 | Ferris et al. | |
| 9,430,213 B2 | 8/2016 | Fu et al. | |
| 2014/0372533 A1* | 12/2014 | Fu | G06F 9/5072 709/204 |
| 2015/0261514 A1* | 9/2015 | Fu | G06F 9/45558 718/1 |
| 2015/0304409 A1* | 10/2015 | Steuer | H04L 67/10 709/203 |

(Continued)

FOREIGN PATENT DOCUMENTS

CN    103092670 A    5/2013

*Primary Examiner* — Wing F Chan
*Assistant Examiner* — Joseph R Maniwang

(57) ABSTRACT

A manager of a cross-cloud distributed application manages the application via a cloud-management service. The application is hosted collectively by plural clouds, at least one of which is a public cloud. The service is provided with log-in credentials for the public cloud so that the resources provided by the public cloud to the application can be discovered. The service collects data generate by the clouds, translates the collected data to conform to a unified data model used by the service. The translated data can be aggregated, e.g. over any group of application instances, e.g., to characterize the distributed application as a whole, any component of the distributed application, or any arbitrary collection of application instances. A cost analysis can determine the cost effectiveness of any potential reconfiguration of the distributed application. The distributed application is reconfigured based, at least in part, on the cost analysis.

10 Claims, 2 Drawing Sheets

(56) References Cited

U.S. PATENT DOCUMENTS

2015/0370594 A1* 12/2015 Ghosh ................ G06F 9/45533
  718/1
2016/0105321 A1   4/2016 Thakkar et al.
2016/0105393 A1   4/2016 Thakkar et al.
2016/0335114 A1  11/2016 Fu et al.

* cited by examiner

MANAGING CROSS-CLOUD DISTRIBUTED APPLICATION

BACKGROUND

Enterprises are increasingly moving computer operations from on-premises systems to the cloud. Public clouds relieve their subscribers of the responsibility for hardware maintenance, while simplifying management tasks such as scaling a distributed application in or out. Private clouds can offer the management simplicity of public clouds, while offering the security associated with maintaining the underlying hardware on premises, as may be required to comply with some laws and regulations.

As each cloud service offers unique advantages, it often makes sense to distribute enterprise applications across cloud services. As suggested above, it may be a requirement to run some components, e.g., medical records keeping, on a private cloud, while other components, e.g., advertising, on a public cloud to minimize the amount of hardware maintenance involved. Also, it may be cost effective to run some components on one public cloud and others on another public cloud, as each public cloud has its own pricing plans.

DETAILED DESCRIPTION

Managing an application distributed across clouds can require mastering multiple very distinct systems for packaging and charging for cloud resources. As a result, comparisons and optimizations can be difficult. For example, it can be difficult to determine which public or private cloud would be most cost-effective in hosting a particular component of a distributed application.

The present invention provides a unified model for managing cross-cloud distributed applications and a translation layer for translating between the unified model and the native interfaces for the individual clouds services. The unification provided by the model is multi-dimensional: the model unifies across clouds and across management functions; accordingly, the model provides a one-stop simplified system for managing cross-cloud distributed applications.

Figure 1:
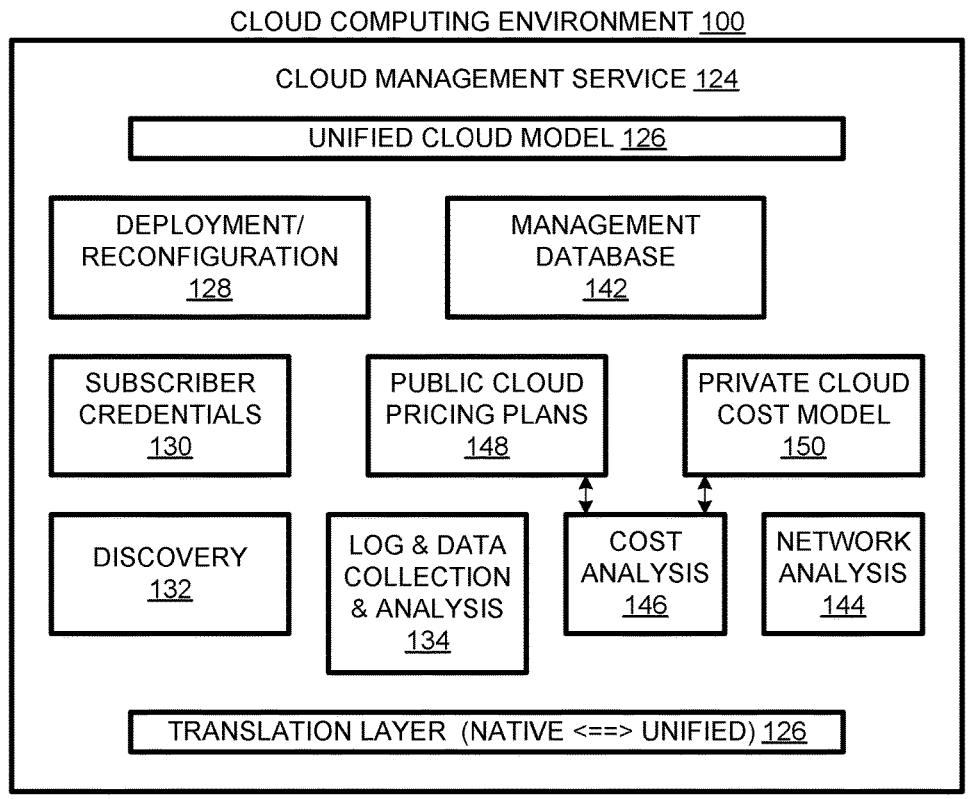
FIG. 1 is a schematic diagram of a cloud-computing environment including a cloud-management service.
Figure 1:
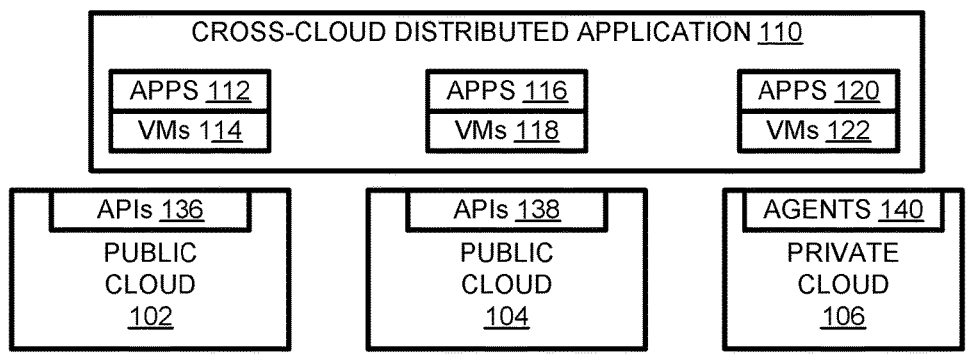

As shown in FIG. 1, a cloud-computing environment 100 includes a first public cloud 102, a second public cloud 104, and a private cloud 106. For example, first public cloud 102 can be Microsoft Azure, the second public cloud 104 can be Amazon Web Services (AWS), and the private cloud 106 can be based on vCenter®, provided by VMware, Inc. In other embodiments, other cloud systems can be used. Also, there can be two or more public clouds and/or at least one public cloud and at least one private cloud.

A cross-cloud distributed application 110 is hosted by clouds 102, 104, and 106. That is, distributed application 110 encompasses application program instances 112 running on respective virtual machines 114 on public cloud 102, application program instances 116 running on respective virtual machines 118 on public cloud 104, and application program instances 120 running on respective virtual machines 122 on private cloud 106. The application instances can include multiple instances of a single application program and/or instances of respective different application programs.

The manager, e.g., a person employed by the subscriber to the public cloud services, for distributed application 110 can manage it via cloud management service 124. More specifically, a manager can access cloud management service 124, e.g., using a web browser or other interface, and interact with the service 124 to monitor and control distributed application 110.

Cloud management service 124 includes a unified cloud model 126. Unified cloud model 124 is a cloud model that translates both to and from each of the cloud platforms it handles. In this case, it translates to and from the native models of public cloud 102, public cloud 104, and private cloud 106. Cloud management service 124 includes a translation layer 126, for translating between the unified model and the native models, respectively, for public cloud 102, public cloud 104, and private cloud 106. This means that data collected respectively from public cloud 102, public cloud 104, and private cloud 106 can be converted to a unified form to permit comparisons between prospective deployments and reconfigurations. Likewise, commands issued by a deployment/reconfiguration function 128 of cloud management service 124 to deploy and reconfigure can be translated and implemented in the selected clouds.

For one example, Amazon Web Services (AWS) has a concept called "Virtual Private Cloud" or ("VPC"), while Microsoft Azure has a concept "Virtual Network". The unified model has a concept called "Networks" that can be mapped back and forth with VPCs on the one hand, and Virtual Networks on the other. For another example, AWS has a concept of an "Availability Zone", while VMware's vCenter has a concept of a "data center". The unified model has a more generic concept of a "resource pool" to which the platform specific constructs are mapped.

If cloud management service 124 deploys a distributed application, it may be presumed to know its configuration, at least initially. However, if a distributed application has been set up before the subscriber employs the cloud service, or if the subscriber modifies a distributed application without notice to the cloud management service, the cloud management service must "discover" the current configuration of the distributed application.

To this end, cloud management service 124 obtains the subscribers credentials 130 to public clouds 102 and 104. The credentials are used by a discovery function 132 to locate and identify virtual machines and other resources hosting and/or servicing subscriber application program instances. Discovery can be applied to an existing distributed application when the services are first engaged, and can be applied periodically or in respond to notices of changes. Note that, in the illustrated embodiment, the cloud management service is informed automatically of reconfigurations (configuration changes) to private cloud 106, so there is no need for discovery regarding distributed application components on private cloud 106.

Cloud management service 124 monitors cross-cloud distributed application 110 using a log and data collection and analysis function 134 by collecting logs and other data from the cloud hosts. Cloud management service 124 accesses public clouds 102 and 104 via application programming interfaces (APIs) 136 and 138, and accesses private cloud 106 via agents 140 installed thereon. Application program instances, the operating systems they run on, and utility programs may all generate logs in the course of operation for various purposes. Cloud management service 124 collects the logs and stores them in a management database 142. A subscriber can then query the database 142, e.g., to find logs of a specified type issued between specified dates.

In addition to collecting logs, cloud management service 124 can collect data in other forms, e.g., utilization data can be collected through inquiries or from tables located. For some public clouds, its virtual machines are placed permanently in a diagnostic mode in which diagnostic table is collected and stored in tables in the public cloud. The cloud management service then accesses these tables periodically to obtain utilization data that it can use for planning and other purposes.

The data collected also can include network data, including statistics regarding ingress and egress to and from each cloud. Among the varied uses of such data are its economic implications, as public clouds provide free intra-cloud transfers, but charge for inter-cloud transfers. A network analysis function 144 can determine if two application instances host on different cloud services interact frequently, it may be cost-effective to reconfigure so that they are on the same cloud service.

Cloud management service 124 makes or assists decisions regarding configuring and reconfiguring distributed applications based on a cost analysis of various alternatives (e.g., "what if" scenarios). To this end, a cost analysis function 146 must determine what the costs associated with those alternatives are. As for the components of the distributed application hosted on public clouds, each public cloud provider publishes a pricing plan 148 that can be used for pricing out hosted components.

In most cases, a private cloud does not have an explicit pricing plan. Instead, a private cloud cost model 150 is used to estimate a cost for deployments on a private cloud so that the private cloud costs and public cloud costs can be compared and aggregated. Cost model 150 can be based on such considerations as the make and model of equipment installed, and the dates such equipment was commissioned, and expected utilization of such equipment. For example, cloud management service can indicate whether it would be cost effective to move a virtual machine so that some relatively expensive inter-cloud transfers become free or less expensive intra-cloud transfers.

It is understood that other cloud management solutions lack the unification, first of all to recognize the inter-cloud communication patterns, and second, to evaluate the savings due to reduced inter-cloud communications achievable by consolidating virtual-machines that frequently access each other onto the same cloud.

Figure 2:
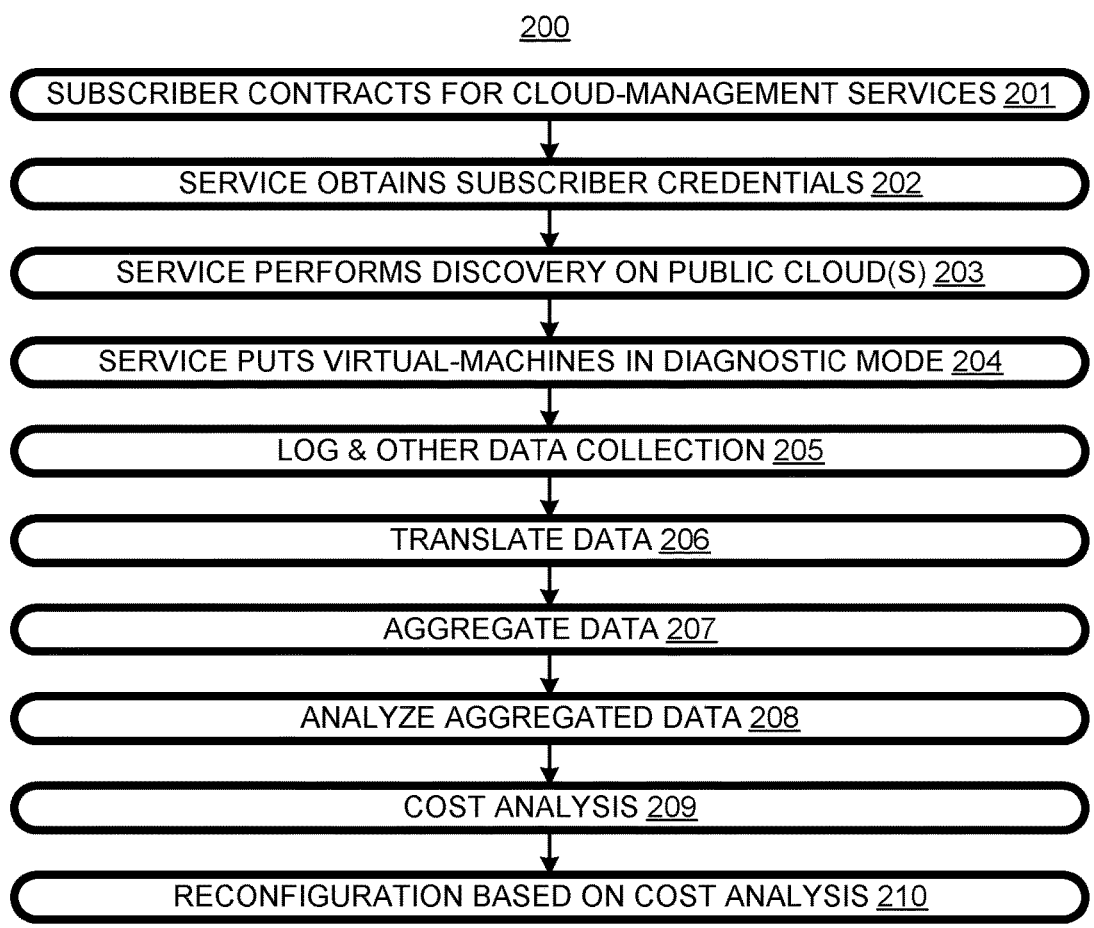
FIG. 2 is a flow chart of a process for reconfiguring a cross-cloud distributed application.

A cloud management process 200 is flow charted in FIG. 2. At 201, a subscriber contracts for cloud management services. At 202, the subscriber provides subscriber credentials to the cloud management service; these credentials are used to allow the cloud management services to gather information and to perform actions on behalf of the subscriber. The credentials are platform specific, for example, on AWS, the credentials can include an access key and a secret key.

At 203, using the credentials, discovery is performed initially and repeatedly thereafter, e.g., to inventory virtual machines, network devices, and storage devices. As to the virtual machines, their respective host clouds are identified along with their capabilities, and the operating systems and applications they host. Discovery is repeated to maintain an accurate representation of the current configuration despite changes made other than through the cloud management service. For example, a subscriber may add a virtual machine to a host public cloud using the native interface for that public cloud. A subsequent discovery would make the cloud management service aware of the new virtual machine.

The discovery process centers around 'discovering' the resources hosted on the customers behalf of either a public or private cloud. These resources can include virtual machines, disks, networks, containers, applications, etc. containers applications etc. Discovering what is running on each virtual machine typically requires an agent running on the virtual machine.

In the event, a distributed application is deployed via the cloud management service; the deployment process itself can serve the discovery function. For example, after deployment, a deployment engine may run a verification to ensure a distributed application or component thereof has been configured as intended. Also, where configuration changes are made exclusively through the cloud management service (as opposed to through native cloud interfaces), the reconfigurations can serve as their own discovery. Where the cloud notifies the cloud management services as changes are made, the notifications contribute to the discovery function.

At 204, virtual machine hosts are put in a diagnostic mode if necessary to obtain utilization data from a public cloud. This action is not required for private clouds and for public clouds that provide utilization in a normal, non-diagnostic mode.

At 205, the cloud management service collects data to help monitor and plan for the distributed application. The data collected includes data from and/or characterizing the devices identified in discovery. The data collected includes: configuration data (e.g., including numbers of processors (CPUs), amounts of configured memory); runtime time-series data, e.g., CPU utilization, memory usage, etc., and log data. These forms of data can be stored in a database of the cloud management service. Utilization data, typically in native from for the source cloud, is collected for each virtual machine.

At 206, the collected data is translated to so that it is compatible with the unified cloud model and, thus, can be compared and aggregated with corresponding data across clouds. At 207, the translated data can be aggregated, for example, to characterize an entire distributed application, any multi-virtual-machine component of the distributed application, or any other arbitrary group of virtual-machine hosts. The utilization data is per virtual machine, while the aggregated data is per group of application instances.

At 208, the unified and aggregated data is analyzed. The collected data includes data collected from networking devices that can provide insight, via network analysis, into inter-cloud data transfers, for which public clouds typically charge. At 209, a cost analysis of alternative configurations can indicate whether it would be cost-effective to rearrange some distributed application components so that components that exchange data frequently are on the same cloud and not on different clouds. The cost analysis can be based on pricing plans published by the public clouds and a cost model designed to obtain data comparable to public cloud pricing plans from data derived from the hardware used and the utilization of that hardware in the private cloud.

Group utilization data can be used to form time profiles for utilization over time per group. This data can be used to detect patterns and trends in utilization. The patterns and trends can then be used to make projections and evaluate "what if" scenarios.

The analyses are used to make decisions regarding reconfiguring the distributed application. The decisions may be made automatically or may require human selection and/or confirmation. At 210, the distributed application is reconfigured based at least in part of the cost analysis. The reconfiguration may involve scaling in, scaling out, adding new component types, updated firmware and/or software, and other changes.

Herein, all art labeled "prior art", if any, is admitted prior art; all art not labeled "prior art", if any, is not admitted prior art. The illustrated embodiments, variations thereupon, and modifications thereto are provided for by the present invention, the scope of which is determined by the following claims.

What is claimed is:

1. A multi-cloud management process comprising:
   using subscriber credentials to access a first cloud, discovering virtualized resources of the first cloud, the first cloud hosting at least a first distributed-application component of a distributed application, the distributed application having at least a second distributed application component hosted by a second cloud, the second cloud being separate from the first cloud;
   using the subscriber credentials to access the first cloud, collecting data from the first and second clouds regarding the distributed application;
   converting the collected data into unified cloud-model data at least in part by translating at least some of the data collected from the first cloud so that it conforms to a unified cloud model;
   analyzing the unified cloud-model data to generate group statistics for a group of distributed application components, the group including at least a first component hosted by the first cloud and at least a second component hosted by the second cloud; and
   modifying a configuration of the distributed application based at least in part on the group statistics, the modifying including changing an allocation of cloud resources to components of the distributed application.

2. The process of claim 1 wherein the first cloud is a public cloud.

3. The process of claim 1 wherein the virtualized resources include virtual machines.

4. The process of claim 1 wherein the collecting data includes collecting network traffic data of data transfers by the distributed application into and out of the first cloud and the second cloud, the modifying including moving a component of the distributed application between the first and second clouds to reduce inter-cloud data transfers.

5. The process of claim 1 wherein costs are assigned to configurations of the distributed application based on a pricing plan for the first cloud and a cost model for the second cloud, the first cloud being a public cloud and the second cloud being a private cloud.

6. A system comprising non-transitory media encoded with code that, when executed by a processor, implements a process including:
   using subscriber credentials to access a first cloud, discovering virtualized resources of the first cloud, the first cloud hosting at least a first distributed-application component of a distributed application, the distributed application having at least a second distributed application component hosted by a second cloud, the second cloud being separate from the first cloud;
   using the subscriber credentials to access the first cloud, collecting data from the first and second clouds regarding the distributed application;
   converting the collected data into unified cloud-model data at least in part by translating at least some of the data collected from the first cloud so that it conforms to a unified cloud model;
   analyzing the unified cloud-model data to generate group statistics for a group of distributed application components, the group including at least a first component hosted by the first cloud and at least a second component hosted by the second cloud; and
   modifying a configuration of the distributed application based at least in part on the group statistics, the modifying including changing an allocation of cloud resources to components of the distributed application.

7. The system of claim 6 wherein the first cloud is a public cloud.

8. The system of claim 6 wherein the virtualized resources include virtual machines.

9. The system of claim 6 wherein the collecting data includes collecting network traffic data of data transfers by the distributed application into and out of the first cloud and the second cloud, the modifying including moving a component of the distributed application between the first and second clouds to reduce inter-cloud data transfers.

10. The system of claim 6 wherein costs are assigned to configurations of the distributed application based on a pricing plan for the first cloud and a cost model for the second cloud, the first cloud being a public cloud and the second cloud being a private cloud.

\* \* \* \* \*